United States Patent
Gailloux et al.

(10) Patent No.: US 8,055,247 B1
(45) Date of Patent: Nov. 8, 2011

(54) MOBILE AUDIBLE DATA SERVICES

(75) Inventors: Michael A. Gailloux, Overland Park, KS (US); Devon Leon Biere, Olathe, KS (US); Charles L. Micklavzina, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 681 days.

(21) Appl. No.: 11/614,183

(22) Filed: Dec. 21, 2006

(51) Int. Cl.
*H04L 29/08* (2006.01)
*H04H 20/71* (2008.01)
*H04H 60/09* (2008.01)
*H04H 40/00* (2008.01)

(52) U.S. Cl. ............... 455/414.4; 455/3.01; 455/3.04; 455/3.06

(58) Field of Classification Search ............... 455/414.1, 455/414.2, 414.3, 414.4, 412.1, 412.2
See application file for complete search history.

(56) References Cited

U.S. PATENT DOCUMENTS

| | | | | |
|---|---|---|---|---|
| 7,200,390 | B1 * | 4/2007 | Henager et al. | 455/419 |
| 7,376,434 | B2 * | 5/2008 | Thomas et al. | 455/466 |
| 7,590,415 | B2 * | 9/2009 | Tijerino | 455/414.3 |
| 7,684,815 | B2 * | 3/2010 | Counts et al. | 455/518 |
| 2004/0203670 | A1 * | 10/2004 | King et al. | 455/414.3 |
| 2007/0049343 | A1 * | 3/2007 | Fukasawa | 455/558 |
| 2007/0150524 | A1 * | 6/2007 | Eker et al. | 707/203 |
| 2007/0214149 | A1 * | 9/2007 | Bodin et al. | 707/10 |
| 2008/0057925 | A1 * | 3/2008 | Ansari | 455/414.4 |
| 2008/0189099 | A1 * | 8/2008 | Friedman et al. | 704/8 |

\* cited by examiner

*Primary Examiner* — Michael Thier

(57) ABSTRACT

A method, system, and media provide audio services for mobile users. The system includes a mobile computing device, a content management server and a network over which the mobile device and server communicate. The method includes receiving a voice-based and/or gesture-based request for playback of content from the user of a mobile device and searching a local data store on the mobile device for the requested content. If the requested content is contained in the local data store, the method renders the requested content in a format for audible reception at the mobile device for the mobile user. If the requested content is not contained in the local data store, then the method queries a remote data service for the requested content. Upon receiving the requested content from the remote data service, the method audibly plays back the requested content at the mobile device for the mobile user.

13 Claims, 4 Drawing Sheets

MOBILE AUDIBLE DATA SERVICES

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Computer users have become increasingly mobile in recent years. Using devices such as laptop computers, cell phones and PDAs (personal digital assistants), mobile computer users can now receive data feeds (or web feeds) and access public and private networks from almost any location. However, mobile users are often engaged in activities that prevent them from interacting effectively with conventional computing devices. For example, a user cannot safely type a message, read an email or browse the Internet while driving a vehicle or walking on a crowded sidewalk. Rather, the mobile user must decide whether to interrupt their current activity by diverting attention to their computing device, or whether to delay their computing activity until a later time.

Typically, audio content can be safely consumed while a mobile user is engaged in activities that would not allow for typing on a keypad or viewing a display screen. For example, it is common for mobile users to listen to music or other audio content while driving, exercising or mowing the lawn. However, such users are typically either not connected to a network at all, or their network access is limited to a dedicated network connection to a single data source. Even if connected to a network, mobile users often experience spotty connectivity to network resources, thereby degrading the user experience. In either case, the mobile users' choice of audio content is usually quite limited (e.g., locally stored and/or portable audio content, radio broadcasts, podcasts).

In addition to user mobility, there are a number of other factors, including accessibility and efficiency, that have contributed to advancements in user interface technologies that do not require a visual display and/or a keypad. For example, audio-to-text interfaces allow users to create text documents in response to voice commands, and text-to-audio applications enable interactive voice response (IVR) units to provide text data to a user in an audio form. Further examples of alternative user selection mechanisms include voice-activated dialing and accelerometer-based gesture recognition devices (e.g., worn on the user's wrist).

SUMMARY

The present invention is defined by the claims below. Embodiments of the present invention solve at least the above problems by providing a system and method for, among other things, providing audio services to mobile users. The present invention has several practical applications in the technical arts including enabling a user of a mobile device to safely and interactively consume data from a remote data source without requiring the mobile user to look at a display or type on a keyboard.

In a first aspect, a set of computer-useable instructions provide a method of receiving at a mobile device content specified by a user for subsequent playback. The user-specified content is received over a network from a remote data service and stored in a local data store in the mobile device. The method includes receiving a voice-based and/or gesture-based request for playback of at least a portion of user-specified content from the user of the mobile device. After processing the request, the method renders the requested content in a format for audible reception at the mobile device for the user.

In a second aspect, a set of computer-useable instructions provide a method of locating content for playback to a mobile user. The method includes receiving a voice-based and/or gesture-based request for playback of content from the user of a mobile device and searching a local data store on the mobile device for the requested content. If the requested content is contained in the local data store, the method renders the requested content in a format for audible reception at the mobile device for the mobile user. If the requested content is not contained in the local data store, then the method queries a remote data service for the requested content. Upon receiving the requested content from the data service, the method audibly plays back the requested content at the mobile device for the mobile user.

In a third aspect, a set of computer-useable instructions provide a method of providing audio services to a mobile user. The method includes receiving a request from a mobile user over a network for delivery of content in audio form and obtaining the requested content from a data source. If the requested content obtained from the source is in text form, the method converts the content from text form into audio form and then transmits the requested content to the mobile user in audio form over the network.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Embodiments of the present invention provide systems and methods for providing requested content to mobile users without requiring the use of a display or a keyboard. A user interacts with the system by speaking into a microphone and/or by manipulating a gesture recognition device. The system uses audio prompts to state menu options to the user, and the user can use voice or gesture to select menu options. By caching user-requested content locally on a mobile device, the effects of spotty network connectivity are mitigated because the requested content can be audibly played back offline. Moreover, the present invention enables a mobile user to consume diverse content in audio form, including but not limited to calendar information, Internet data, news, radio, email messages, banking information, stock quotes, online auctions, etc., and further enables the user to take action based on the playback of audio data (e.g., make a purchase or bid).

Figure 1:
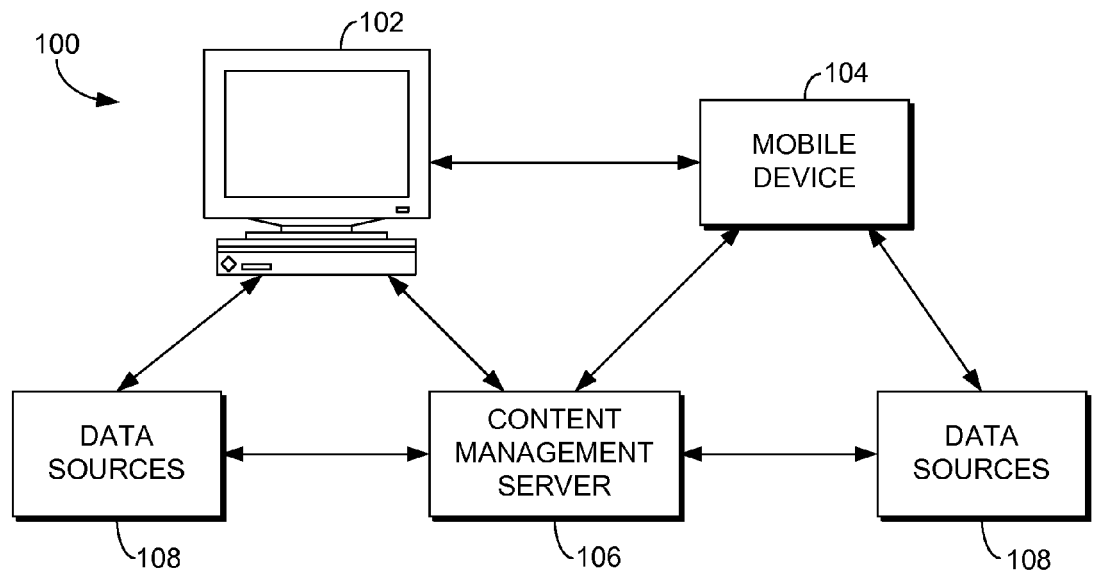
FIG. 1 is a block diagram of an exemplary system in accordance with one embodiment of the present invention.

An embodiment of the system 100 of the present invention is shown generally in FIG. 1. The system 100 includes a computer 102, a mobile device 104, a content management server 106 and one or more data sources 108. The computer 102 can be any conventional computing device but is preferably a personal computer with a display monitor, keyboard, mouse and/or other pointing device. The mobile device 104 can be a cell phone, a personal digital assistant (PDA), or the like. In a preferred embodiment of the present invention, the computer 102 and mobile device 104 are capable of wirelessly communicating with one another over a network, such as a data network or a telecommunications network. The mobile device 104 is discussed below in further detail in connection with FIG. 2. The content management server 106 is a server that is capable of communicating over a network with the computer 102, the mobile device 104 and one or more data sources 108. The server 106 is discussed below in further detail in connection with FIG. 3. The data sources 108 can be any public or private data source capable of providing content or other data to the content management server 106, the computer 102 and/or the mobile device 104.

In one exemplary scenario, a user at computer 102 is connected to the content management server 106 over a network, such as the Internet. Utilizing a graphical user interface (GUI) at the computer 102, the user is able to select, manage and subscribe to data feeds, such as RSS (Really Simple Syndication) feeds, from server 106 and organize the requested content/feeds into channels and/or audio programs. Examples of topic-based channels, or groupings of content, include entertainment, business, family, sports, news, etc. Further, the user at computer 102 can specify content/feed delivery options (e.g., push on schedule, pull on demand), configure the settings for each feed (ordering, frequency of updates, etc.), preview their channels and/or audio programs through the GUI and help the system "learn" their interests and preferences by selecting content exemplars. Thus, the user can effectively build a "daily audio newspaper" and other content configurations at the computer 102 for audio playback on the user's mobile device 104. As used herein, the term "audio" is used broadly to include both speech and voice.

Although downloading content and subscribing to data feeds from a server to a client computer over a network are well-known in the art, the system 100 of the present invention includes additional functionality, including the ability to obtain text data, to convert the text data to audio data, and to playback the audio data on the mobile device 104. For example, text-based Internet content, such as a stock ticker, is converted to audio data and played back for a user upon request. In one embodiment, the user playback requests are stored or cached on the mobile device and/or at the remote data service so that an adaptive learning process can determine the preferences of the user and attempt to cache the user's preferred content on the mobile device. Moreover, one embodiment of the invention includes a client application running on the computer 102 that integrates with desktop-based RSS/web applications for identification of feeds and content exemplars, and secure site credential storage. The client application also utilizes a browser program to access RSS feeds, URLs (Uniform Resource Locators) and authentication/service layers for private data sources. An example of a private data source is an investment company from which the user can access individual account information, such as his or her current account balance.

Figure 2:
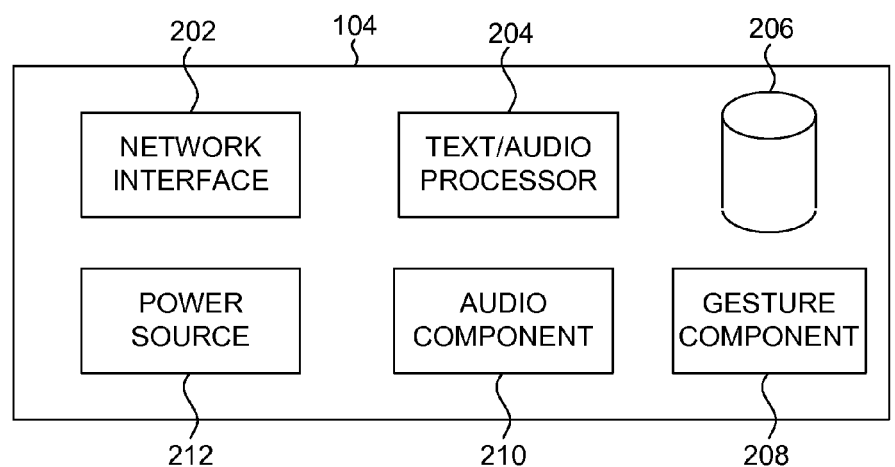
FIG. 2 is a block diagram of an exemplary embodiment of the mobile device of FIG. 1.

FIG. 2 is a block diagram of an exemplary embodiment of mobile device 104. Device 104 includes a network interface 202, a text/audio processor 204, a database or data store 206, an optional gesture component 208, an audio component 210 and a power source 212. Those skilled in the art will readily appreciate that each of the individual components of the mobile device 104 are well-known in the art, and the particular combination and connection of components for mobile device 104 may vary somewhat depending on a number of factors including the particular context in which the mobile device 104 will be used. For example, the embodiment of FIG. 1 contemplates client-side functionality distributed between the computer 102 and the mobile device 104. Those skilled in the art will readily understand that the client-side functionality could be distributed differently between the computer 102 and the mobile device 104, including embodiments in which the computer 102 is optional because all of the required functionality is provided on the mobile device 104. In an embodiment that does not include the computer 102, the mobile device 104 includes a non-graphical user interface through which the mobile user selects, manages and subscribes to data feeds and acquires other desired content. In such an embodiment, the mobile device may optionally include GUI functionality in addition to the non-graphical user interface.

The network interface 202 enables the mobile device 104 to communicate with the computer 102, the content management server 106 and one or more data sources 108. For example, the network interface 202 may include embedded CDMA (Code Division Multiple Access), IEEE 802.11, or the like. Optionally, the network interface may also include GPS (Global Positioning Satellite) functionality. The text/audio processor 204 is a microprocessor or central processing unit (CPU) that is configured to process text data and/or audio data that is received at the mobile device 104 prior to storage in database 206. Similarly, processor 204 facilitates playback of text data or audio data stored in database 206 in response to a playback request from a user at the mobile device 104. For example, if the user requests playback of text data stored in database 206, processor 204 converts the text data to audio data for audible playback to the user. Alternatively, in an embodiment in which audio data is stored in database 206, processor 204 would not require functionality to convert text data to audio data. As mentioned previously, database 206 is a data store that can contain text data and/or audio data.

The optional gesture component 208 is a gesture-recognition device, as is well-known in the art, that allows a user to interact with the mobile device 104 and a remote data service without a display or keypad and without issuing voice-based instructions. For example, the gesture component 108 may be a wrist-worn mechanism utilizing one or more accelerometers.

In one embodiment, the audio component 210 is a speaker/microphone combination (e.g., an earbud) that facilitates receiving and playing back audio data. The audio component 210 may comprise a plurality of separate components or subcomponents, or a single component with dual functionality. Moreover, part or all of the speaker/microphone combination may be integrated into a single housing for the mobile device 104. In one embodiment, the audio component 210 is a speaker and user requests are received through the gesture component 208, such as a wristworn gesturing mechanism, in which case a microphone is optional. Mobile device 104 also includes a power source 212, such as a battery.

Figure 3:
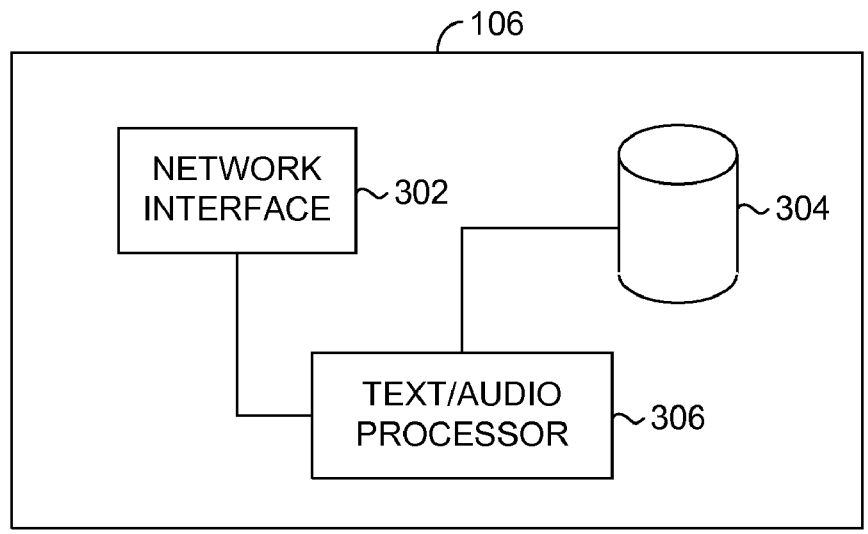
FIG. 3 is a block diagram of an exemplary embodiment of the content management server of FIG. 1.

Further details of an exemplary embodiment of the content management server 106 are shown in FIG. 3. Server 106 includes a network interface 302, a database or data store 304, and a text/audio processor 306. As with the components of the mobile device 104, the server 106 may include additional or fewer components than shown in FIG. 3. For example, the server 106 may comprise one server or a plurality of servers. In any event, the server 106 is configured to provide a remote data service for the mobile user of device 104.

The network interface 302 is similar to the network interface 202 in that it is configured to facilitate communication over a network between the server 106 and the computer 102, the mobile device 104 and one or more data sources 108. The database 304 is similar to the database 206 in that it can contain text data and/or audio data. However, database 304 can preferably store significantly more data than database 206. The text/audio processor 306 is similar to processor 204 in that it is a CPU that can convert text data stored in database 304 into audio data that can be forwarded via network interface 302 to mobile device 104 for storage in database 206 and/or playback to a user of the mobile device. The processor 306 may also be configured to receive text data from one or more data sources 108 via network interface 302 and convert that text data to audio data for storage in database 304.

In the example described above in which the user of the computer 102 and mobile device 104 subscribes to data feeds, the database 304 serves as a repository for "deltas" until they can be converted into audio segments by the processor 306 and transferred to the customer storage device 206. Alternatively, the "deltas" may be transmitted to the mobile device 104 in text form and then converted into audio form. One type of "delta" is an alert or update that can be provided to the user without interrupting the activity the user is engaged in at the moment. The server 306 is constantly searching for updates to the user-requested content, which can be provided to the user in near real-time if the user is connected to the network. The processor 306 aggregates the requested content, which may be in a variety of data formats, and ensures that the requested content is properly formatted prior to transmission. In one embodiment, a network application running on the server 106 provides interactive voice response (IVR) prompts to the mobile user and allows the user to complete secured transactions (e.g., make a purchase).

Figure 4:
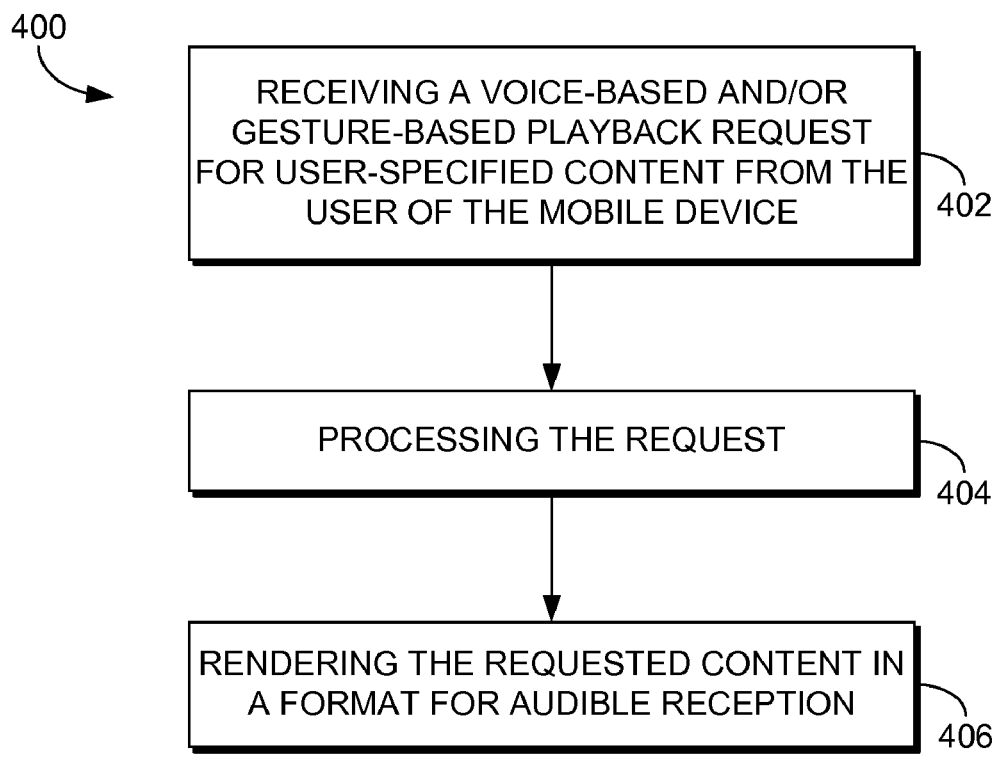
FIG. 4 is a flow diagram of an exemplary method in accordance with one embodiment of the present invention.

Referring next to FIG. 4, an exemplary method 400 is illustrated according to one embodiment of the present invention. In method 400, a mobile user requests playback of content that is stored locally on the mobile device. For example, the user may request playback of "my calendar for today," in which case the locally stored calendar information for today is audibly played back for the user. Similarly, the user may request playback of other content, such as a particular song. At 402, the method 400 includes receiving a voice-based and/or gesture-based playback request for user-specified content from the user of the mobile device. After receiving the playback request, the method 400 processes the request at 404. Under certain circumstances, such as when text data must be converted to audio data, processing the request may involve additional steps that are not required when the requested data is already in audio form. Next, the method 400 includes rendering the requested content in a format for audible reception at 406.

Figure 5:
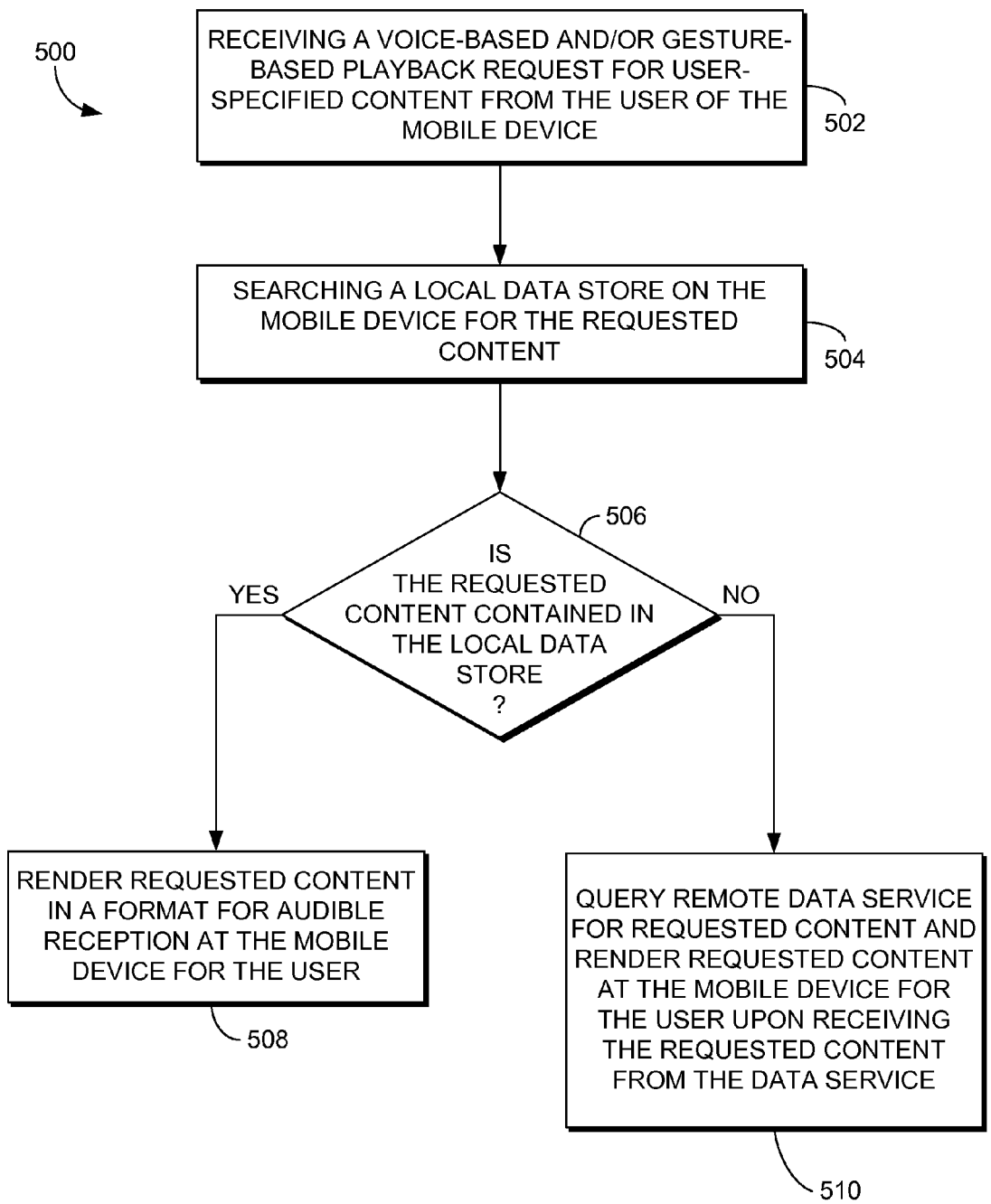
FIG. 5 is a flow diagram of an exemplary method in accordance with one embodiment of the present invention.

FIG. 5 depicts an exemplary method 500 according to one embodiment of the present invention. In method 500, a mobile user requests playback of content that may not be stored locally on the mobile device. At 502, a voice-based and/or gesture playback request is received for user specified content from the user of the mobile device. The method 500 then searches a local data store on the mobile device for the requested content at 504. At decision block 506, the method 500 determines whether the requested content is contained in the local data store. If so, the method proceeds to 508 and renders the requested content in a format for audible reception at the mobile device for the user. However, if it is determined at 506 that the requested content is not contained in the local data store, then the method proceeds to 510 to query a remote data service for the requested content. Upon obtaining the requested content from the remote data service, the method renders the requested content at the mobile device for the user.

Figure 6:
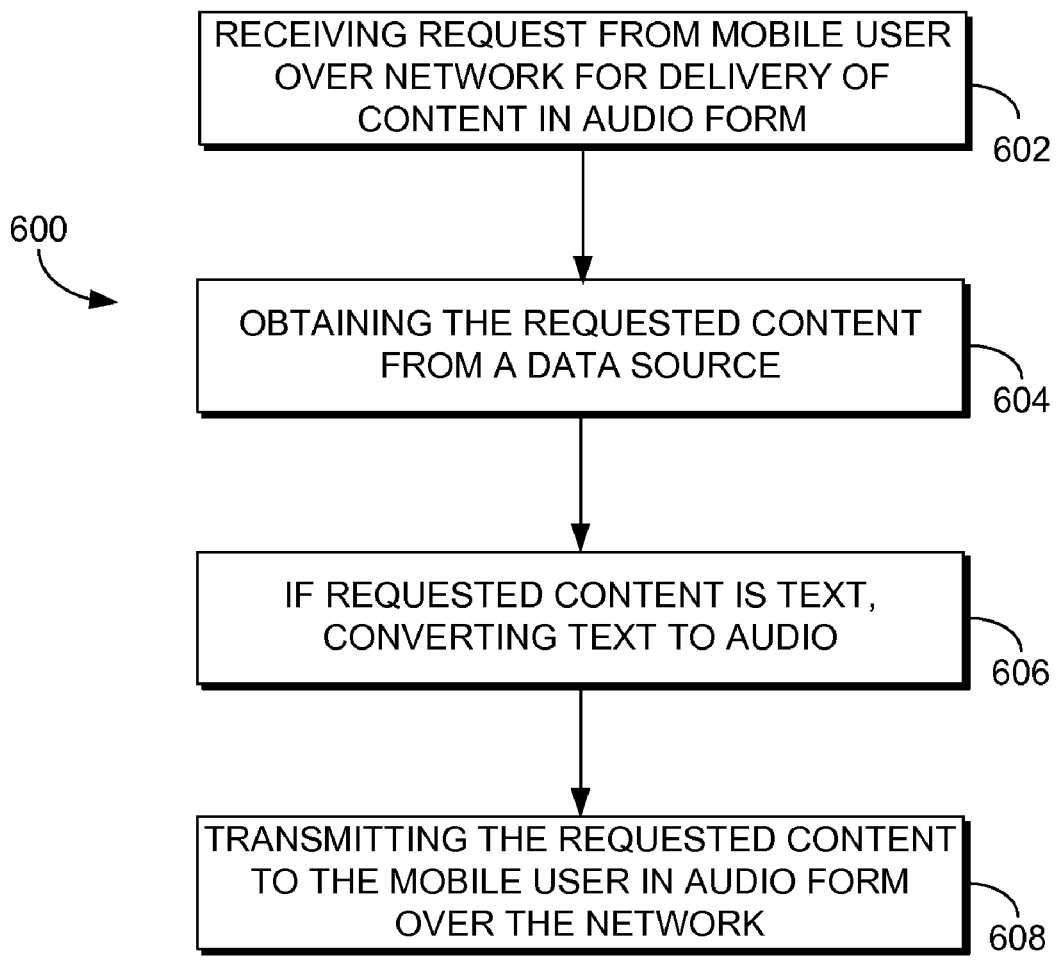
FIG. 6 is a flow diagram of an exemplary method in accordance with one embodiment of the present invention.

Turning to FIG. 6, an exemplary method 600 is shown according to one embodiment of the present invention. Preferably, the method 600 occurs at the content management server 106. At 602, the method receives a request from a mobile user over a network for delivery of content in audio form. The request may be a voice-based request or a gesture-based request from the mobile device 104. Alternatively, the request may be a data feed request on behalf of the user from either the computer 102 or from the mobile device 104 (e.g., from an aggregator program). In any event, user requests may be stored in database 304 and used to adaptively learn the preferences of the user. Adaptive learning technology is well known in the art, and in the context of the present invention can be used to proactively obtain a user's preferred content. Then, at 604, the method obtains the requested content from a data source. If the requested content is in text form, then the method converts the text data to audio data at 606. Finally, at 608, the method transmits the requested content to the mobile user in audio form over the network. In an alternative embodiment, requested content in text form is transmitted in text form to the mobile device 104 for conversion to audio form.

ACRONYMS AND SHORTHAND NOTATIONS

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| CDMA | Code Division Multiple Access |
| CPU | Central Processing Unit |
| GPS | Global Positioning Satellite |
| GUI | Graphical User Interface |
| IEEE | Institute of Electrical and Electronics Engineers |
| IVR | Interactive Voice Response Units |
| PDA | Portable Digital Assistant |
| RSS | Really Simple Syndication |
| UI | User Interace |
| URL | Universal Resource Locator |

Further, various technical terms are used throughout this description. A definition of such terms can be found in *Newton's Telecom Dictionary* by H. Newton, 21$^{st}$ Edition (2005). These definitions are intended to provide a clearer understanding of the ideas disclosed herein but are not intended to limit the scope of the present invention. The definitions and terms should be interpreted broadly and liberally to the extent allowed the meaning of the words offered in the above-cited reference.

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Combinations of the above are included within the scope of computer-readable media.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

We claim:

1. One or more non-transitory computer-storage media having computer-useable instructions embodied thereon for performing a method of receiving at a mobile device content specified by a user for subsequent playback, wherein the user-specified content is grouped into a plurality of topic-based channels and received over a network from a remote data service and stored in a local data store in the mobile device, the method comprising:

receiving, from the user of the mobile device, a request for playback of at least a portion of user-specified data content from one of said plurality of topic-based channels, wherein the request is at least one of a voice-based request and a gesture-based request;

processing the request;

storing an identifier associated with the requested content in the local data store;

updating a set of adaptively learned preferences of the user based at least in part on the identifier associated with the requested content, wherein the preferences can be used to determine the user's preferred content; and transmitting the requested content to the mobile device, wherein the requested content is converted by at least one of the remote data service or the mobile device from text-based data to a format for audible playback.

2. The media of claim 1, wherein one or more of the topic-based channels are configured by the user at a computer using a graphical user interface.

3. The media of claim 1, wherein the user-specified content comprises one or more data feeds.

4. The media of claim 3, wherein at least one of the data feeds is an RSS feed.

5. The media of claim 3, wherein at least one of the data feeds comprises converting text-based content stored in the local data store to audio-based content in response to receiving a request for playback of the text-based content.

6. The media of claim 1, wherein the user-specified content received from the data service is text-based content.

7. A consumer electronics product utilizing the computer-useable instructions of claim 1.

8. The media of claim 1, wherein the user-specified data content includes at least one of:
(A) calendar information;
(B) banking information; and
(C) email messages.

9. The media of claim 1, wherein the method further comprises the step of allowing the user to take action based on the user-specified data content.

10. The media of claim 1, wherein the method further comprises the step of proactively obtaining the user's preferred content based on the learned preferences.

11. One or more non-transitory computer-storage media having computer-useable instructions embodied thereon for performing a method of locating text-based content for playback to a mobile user, the method comprising:

receiving a request for playback of text-based content from the user of a mobile device, wherein the request is at least one of a voice-based request and a gesture-based request;

determining whether the requested text-based content is contained in a local data store on the mobile device and, if not, querying a remote data service for the requested text-based content and upon receiving the requested text-based content from the remote data service caching the requested text-based content in the local data store;

if a determination is made that the requested text-based content was already in the data store, determining in response to said determination whether an update is available for the requested text-based content, and if so, obtaining a text-based delta representing the update for the requested text-based content;

converting the requested text-based content to audio-based content; and audibly playing back the audio-based content at the mobile device for the mobile user.

12. A consumer electronics product utilizing the computer-useable instructions of claim 11.

13. One or more non-transitory computer-storage media having computer-useable instructions embodied thereon for performing a method of providing audio services to a mobile user, the method comprising:

receiving a request from a mobile user over a network for delivery of text-based content, wherein the request is at least one of a voice-based request and a gesture-based request;

obtaining the requested content from a data source;

transmitting the requested content to the mobile user over the network;

searching for updates to the user-requested content, wherein it is determined in near real-time that an update is available for the requested content without having received a request from the user to do so;

obtaining a text-based delta representing the update for the requested content; and providing the update to the mobile device in near real-time, wherein the text-based delta is converted from text-based data to an audio format at the mobile device or prior to transmitting the update to the mobile device.

* * * * *